United States Patent
Kim et al.

(10) Patent No.: US 9,525,467 B2
(45) Date of Patent: Dec. 20, 2016

(54) COOPERATION MULTI-INPUT MULTI-OUTPUT TRANSMITTING/RECEIVING METHOD AND TERMINAL FOR SUPPORTING THE SAME

(71) Applicant: ELECTRONICS AND TELECOMMUNICATIONS RESEARCH INSTITUTE, Daejeon (KR)

(72) Inventors: Seokki Kim, Daejeon (KR); Sung Cheol Chang, Daejeon (KR); Seungkwon Cho, Daejeon (KR); Soojung Jung, Daejeon (KR); Hyung Jin Kim, Daejeon (KR); Hyun Lee, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/452,579

(22) Filed: Aug. 6, 2014

(65) Prior Publication Data

US 2015/0043671 A1 Feb. 12, 2015

(30) Foreign Application Priority Data

Aug. 8, 2013 (KR) .................. 10-2013-0094357
Jul. 21, 2014 (KR) .................. 10-2014-0092150

(51) Int. Cl.
*H04B 7/02* (2006.01)
*H04L 1/02* (2006.01)
*H04B 7/04* (2006.01)
*H04B 7/155* (2006.01)

(52) U.S. Cl.
CPC ............ *H04B 7/0413* (2013.01); *H04B 7/026* (2013.01); *H04B 7/15592* (2013.01)

(58) Field of Classification Search
CPC ........ H04L 1/0618; H04L 1/06; H04L 5/0053; H04W 72/042
See application file for complete search history.

(56) References Cited

U.S. PATENT DOCUMENTS

| | | | |
|---|---|---|---|
| 2005/0169401 A1* | 8/2005 | Abraham et al. | 375/295 |
| 2005/0175112 A1* | 8/2005 | Pisoni et al. | 375/260 |
| 2006/0195872 A1 | 8/2006 | Seo et al. | |

(Continued)

FOREIGN PATENT DOCUMENTS

KR 10-2013-0066545 A 6/2013

OTHER PUBLICATIONS

Seokki Kim et al., "Cooperative MIMO", Wired & Wireless Access Research Department, ETRI (Korean and English versions), Mar. 25, 2014.

*Primary Examiner* — Hirdepal Singh
*Assistant Examiner* — Gina McKie
(74) *Attorney, Agent, or Firm* — Rabin & Berdo, P.C.

(57) ABSTRACT

Disclosed herein are a cooperation MIMO transmitting/receiving method and a terminal for supporting the same. A master terminal forms a slave terminal and a cluster performing cooperation communication. The master terminal transmits some data of data to be transmitted to a slave terminal and shares the some data with the slave terminal, and the slave terminal transparently transmits data transmitted from the master terminal to a target node.

13 Claims, 7 Drawing Sheets

(56) References Cited

U.S. PATENT DOCUMENTS

| | | | |
|---|---|---|---|
| 2009/0028042 A1* | 1/2009 | Chin et al. | 370/203 |
| 2009/0262857 A1* | 10/2009 | Jeong | H04L 27/2684 375/267 |
| 2010/0136994 A1* | 6/2010 | Kim | H04W 72/082 455/450 |
| 2011/0194495 A1* | 8/2011 | Seo et al. | 370/328 |
| 2011/0217971 A1* | 9/2011 | Kim et al. | 455/422.1 |
| 2012/0157140 A1* | 6/2012 | Kim et al. | 455/501 |
| 2012/0231739 A1 | 9/2012 | Chen et al. | |
| 2013/0029680 A1* | 1/2013 | Park et al. | 455/450 |
| 2013/0286882 A1* | 10/2013 | Lim | H04W 72/0406 370/252 |
| 2013/0308490 A1* | 11/2013 | Lim | H04B 7/026 370/252 |
| 2014/0003264 A1* | 1/2014 | Shin | H04B 7/0689 370/252 |
| 2015/0103778 A1* | 4/2015 | Kim | H04W 72/04 370/329 |
| 2015/0358836 A1* | 12/2015 | Zhu | H04W 16/10 370/329 |
| 2016/0105903 A1* | 4/2016 | Hessler | H04W 16/02 455/450 |

* cited by examiner

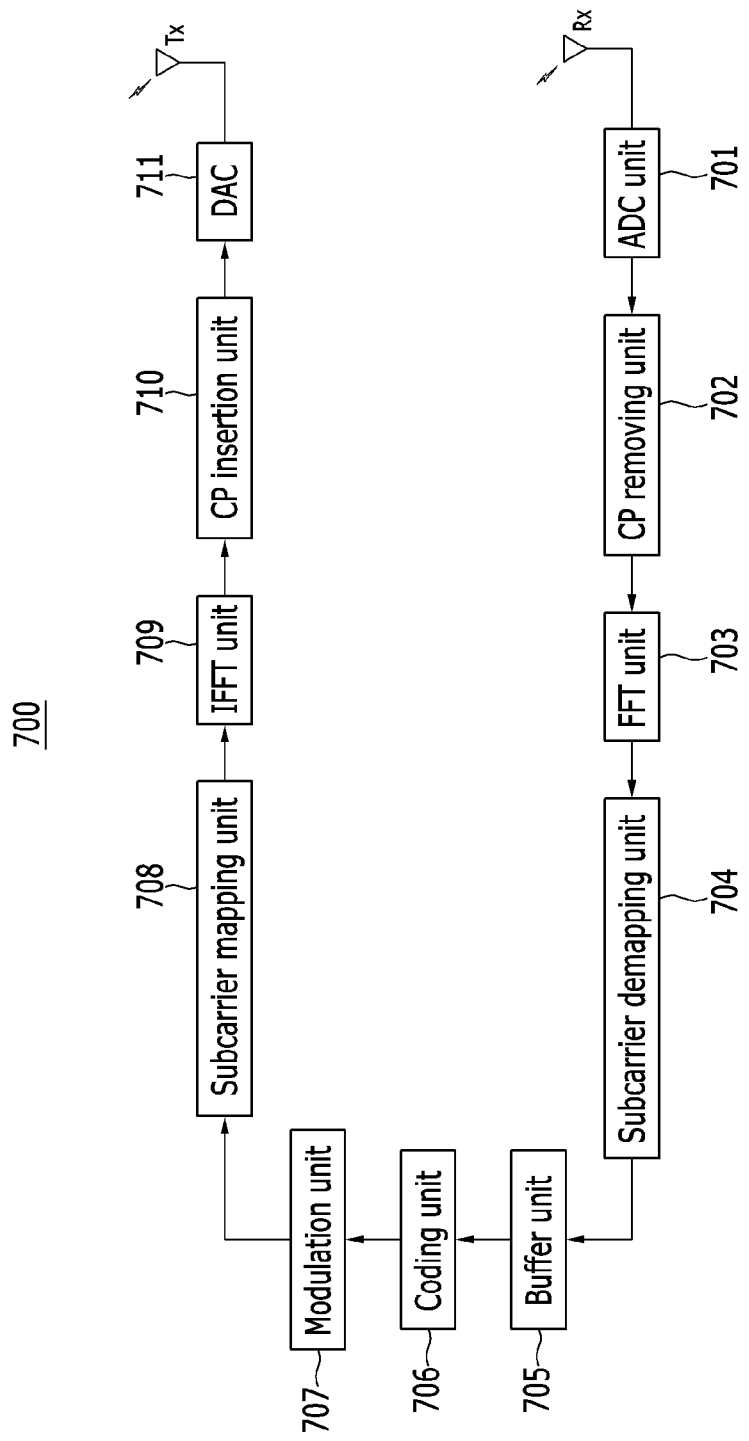

COOPERATION MULTI-INPUT MULTI-OUTPUT TRANSMITTING/RECEIVING METHOD AND TERMINAL FOR SUPPORTING THE SAME

CROSS-REFERENCE TO RELATED APPLICATION

This application claims priority to and the benefit of Korean Patent Application No. 10-2013-0094357 and 10-2014-0092150 filed in the Korean Intellectual Property Office on Aug. 8, 2013 and Jul. 21, 2014, respectively, the entire contents of which are incorporated herein by reference.

BACKGROUND OF THE INVENTION (a) Field of the Invention

The present invention relates to a cooperation multi-input multi-output (MIMO) transmitting/receiving method and a terminal for supporting the same.

(b) Description of the Related Art

With the rapid spread of smart mobile devices, wireless data traffic is growing rapidly. To cope with this problem, various methods for increasing transmission capacity in a wireless communication network have been proposed.

According to an information theory established by Shannon in 1948, transmission capacity C of a radio channel may be defined by the following Equation 1.

$$C = W \log_2(1+SNR) [\text{bps/Hz}] \quad \text{(Equation 1)}$$

In the above Equation 1, W represents a bandwidth and SNR represents a signal-to-noise power ratio.

An example of the various methods for increasing transmission capacity may include a multi-input multi-output (MIMO) transmitting/receiving method using multiple antennas. The MIMO transmitting/receiving method may increase transmission capacity in proportion to a number of antennas of a transceiver without using additional frequency resources in the wireless mobile communication environment.

In the case of using the MIMO transmitting/receiving method, the capacity of the radio channel is defined by the following Equation 2.

$$C = Q \cdot W \log_2(1+SNR)[\text{bps/Hz}] \quad \text{(Equation 2)}$$

In the above Equation 2, Q represents a smaller number of the number of transmitter antennas and the number of receiver antennas.

However, to increase the capacity of the radio channel using the MIMO transmitting/receiving method, correlation between channels of the respective transmitting/receiving antennas needs to be small. To this end, an interval between the antennas needs to be increased, but with the miniaturization of smart devices, there is a limitation in increasing the interval between the antennas. Further, to increase the number of antennas used, many constraints occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cooperation MIMO transmitting/receiving method having advantages of increasing transmission capacity.

An exemplary embodiment of the present invention provides a method for allowing a first terminal to transmit first data. The method may include: forming a cluster by the first terminal and at least one second terminal performing cooperation communication with the first terminal; transmitting second data which is at least a portion of the first data to the second terminal; and transmitting the first data to a target node for receiving the first data in cooperation with the second terminal.

The transmitting of the first data may include: transparently transmitting, by the second terminal, the second data to a destination; and transmitting, by the first terminal, the remaining data other than the second data in the first data to the destination.

The second terminal may perform the same role as an amplify forward (AF) relay station.

The forming of the cluster may include: synchronizing the second terminal with the first terminal; and searching for the second terminal.

The second data may be transmitted to the second terminal through direct communication between the first terminal and the second terminal.

The method may further include: providing a first cluster including the first terminal and the second terminal and a second cluster including a third terminal and a fourth terminal; transmitting, by the first cluster, data to the target node using a first resource in a first period; and sharing, by the fourth terminal, data with the third terminal using the first resource for the cooperation communication in the first period. The method may further include: transmitting, by the second cluster, data to the target node using a second resource in a second period; and sharing, by the first terminal, data with the second terminal using the second resource for the cooperation communication in the second period.

The method may further include: providing the first cluster including the first terminal and the second terminal and a second cluster including a third terminal and a fourth terminal; transmitting, by the first cluster, data to the target node using a first resource in a first period; transmitting, by the second cluster, data to the target node using a second resource in a second period; sharing, by the first terminal, data with the second terminal using a third resource for the cooperation communication in a third period; and sharing, by the third terminal, data with the fourth terminal using the third resource for the cooperation communication in the third period.

The target node may be a base station or a cluster different from the cluster including the first terminal and the second terminal.

Another exemplary embodiment of the present invention provides a method for allowing a first terminal to receive a first symbol. The method may include: forming a cluster by a first terminal and at least one second terminal performing cooperation communication with the first terminal; receiving a second symbol which is at least a portion of the first symbol from a transmitting node transmitting the first symbol; and receiving a third symbol which is at least a portion of the first symbol from the second terminal.

The second terminal may transparently transmit the third symbol to the first terminal.

The method may further include: providing a first cluster including the first terminal and the second terminal and a second cluster including a third terminal and a fourth terminal; performing, by the first cluster, macro transmission with the transmitting node using a first resource in a first period; sharing, by the fourth terminal, a symbol with the third terminal using the first resource for the cooperation communication in the first period; performing, by the second cluster, macro transmission with the transmitting node using a second resource in a second period; and sharing, by the second terminal, a symbol with the first terminal using the second resource for the cooperation communication in the second period.

The method may further include: providing a first cluster including the first terminal and the second terminal and a second cluster including a third terminal and a fourth terminal; performing, by the first cluster, macro transmission with the transmitting node using a first resource in a first period; performing, by the second cluster, macro transmission with the transmitting node using a second resource in a second period; sharing, by the second terminal, a symbol with the first terminal using a third resource for the cooperation communication in a third period; and sharing, by the fourth terminal, a symbol with the third terminal using the third resource for the cooperation communication in the third period.

The transmitting node may be a base station or a cluster different from the cluster including the first terminal and the second terminal.

The first and second resources may be divided into the third resource by TDM.

The forming of the cluster may include: synchronizing the second terminal with the first terminal; and searching for the second terminal.

Yet another exemplary embodiment of the present invention provides a terminal configuring a first terminal and a cluster and sharing at least a portion of data transmitted from or received by the first terminal with the first terminal. The terminal may include: an ADC unit converting some data into a digital signal; a cyclic prefix (CP) removing unit removing a CP from the digital signal; an FFT unit converting a signal from which the CP is removed into a frequency domain symbol; a subcarrier demapping unit demapping a subcarrier in the frequency domain symbol; a subcarrier mapping unit mapping some demapped data to the subcarrier; an IFFT unit converting the mapped data into a time domain symbol; a CP insertion unit inserting the CP into the time domain symbol; and a DAC unit converting a digital signal into which the CP is inserted into an analog signal.

The data may be transmitted as they are through the ADC unit, the CP removing unit, the FFT unit, the subcarrier demapping unit, the subcarrier mapping unit, the IFFT unit, the CP insertion unit, and the DAC unit.

The terminal may further include: a coding unit performing source coding or channel coding on the demapped data; and a modulation unit modulating the source coded or channel coded signal and transmitting the modulated signal to the subcarrier mapping unit.

According to the exemplary embodiments of the present invention, it is possible to increase the transmission capacity using the cooperation MIMO transmission/reception.

BRIEF DESCRIPTION OF THE DRAWINGS

FIG. 7 is a diagram illustrating a slave terminal according to an exemplary embodiment of the present invention.

DETAILED DESCRIPTION OF THE EMBODIMENTS

Figure 1:
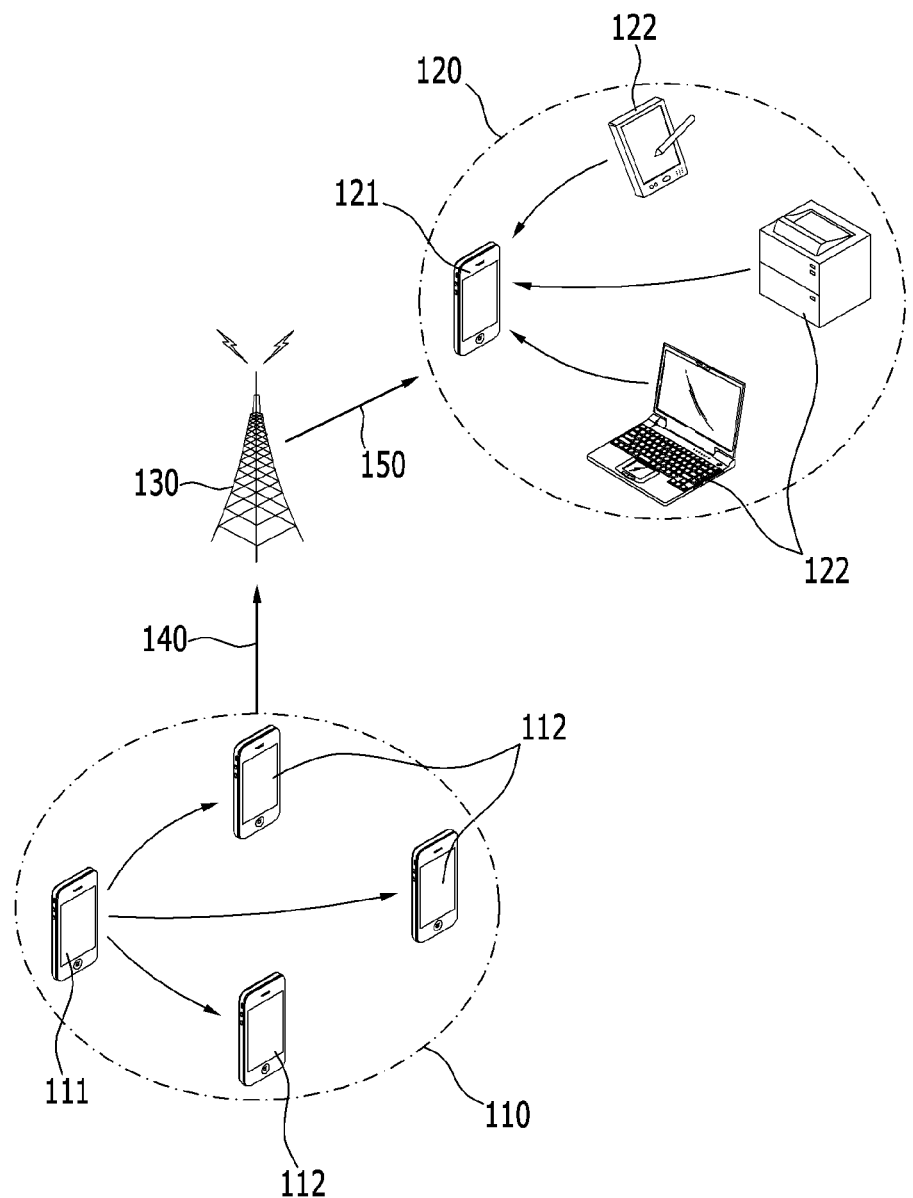
FIG. 1 is a diagram illustrating a cellular network environment for cooperation MIMO transmission/reception according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like, and may include functions of all or some of the terminal, the MT, the AMS, the HR-MS, the SS, the PSS, the AT, the UE, and the like Further, a base station (BS) may be called an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like, and may also include functions of all or some of the ABS, the nodeB, the eNodeB, the AP, the RAS, the BTS, the MMR-BS, the RS, the HR-RS, and the like.

FIG. 1 is a diagram illustrating cellular network environment for cooperation MIMO transmission/reception according to an exemplary embodiment of the present invention.

For cooperation MIMO transmission/reception, a plurality of terminals are collected and thus a cluster is configured. The cluster may be classified into a transmitting cluster 110 and a receiving cluster 120. The transmitting cluster 110 is a cluster for performing uplink communication with a base station 130, and the receiving cluster 120 is a cluster for performing downlink communication with the base station 130.

The plurality of terminals configuring the cluster may be classified into master terminals 111 and 121 and slave terminals 112 and 122. The master terminal 111 is a terminal serving to transmit data and the master terminal 121 is a terminal serving to receive data. The slave terminal 112 is a terminal which performs cooperation communication to transmit data and the slave terminal 122 is a terminal which performs cooperation communication to receive data. The master terminal 111 transmits data to be transmitted to the base station 130 to the slave terminal 112 and thus the master terminal 111 and the slave terminal 112 share the data, and the slave terminal 122 transmits data received from the base station 130 to the master terminal 121 and thus the slave terminal 122 and the master terminal 121 share the data.

Figure 2:
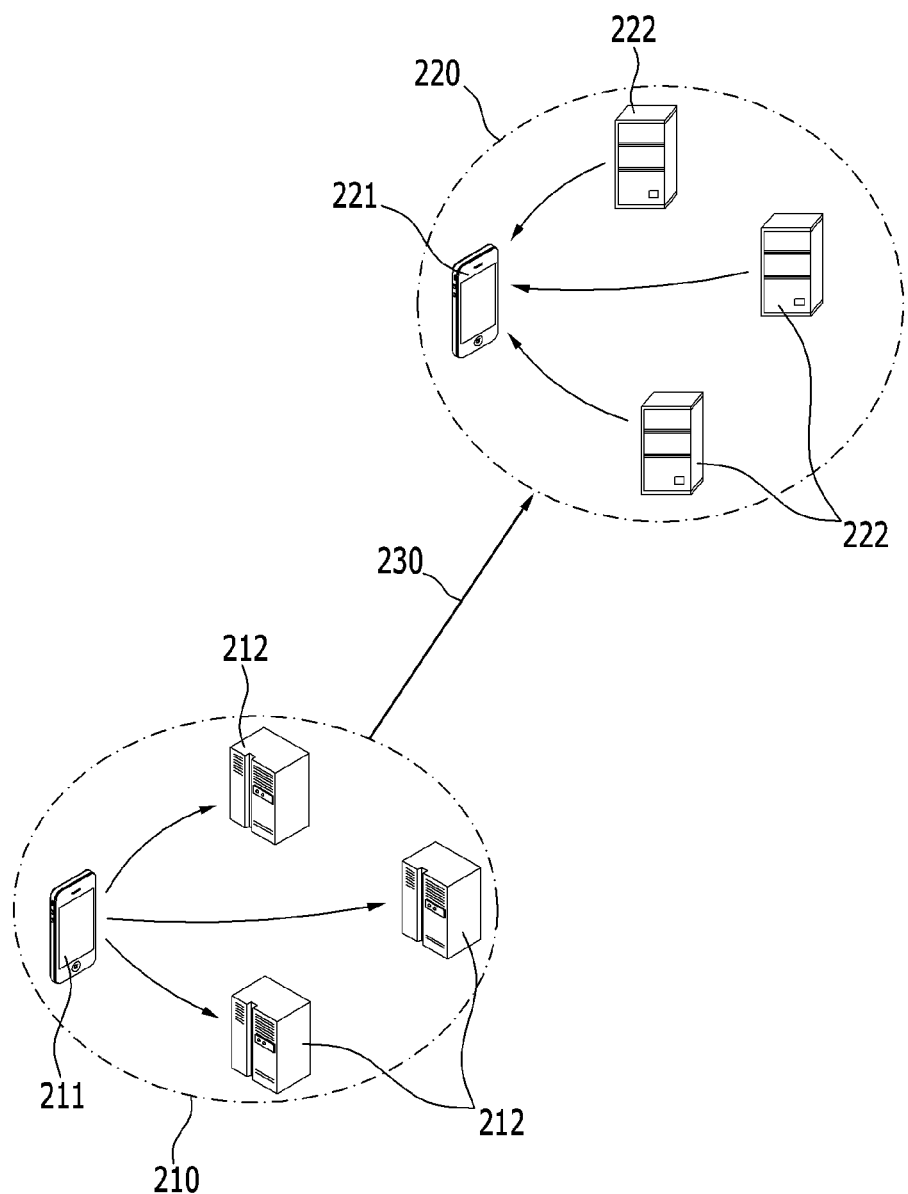
FIG. 2 is a diagram illustrating a distributed network environment for cooperation MIMO transmission/reception according to an exemplary embodiment of the present invention.

FIG. 2 is a diagram illustrating a distributed network environment for cooperation MIMO transmission/reception according to an exemplary embodiment of the present invention.

The distributed network environment does not represent an environment in which the terminal communicates with the base station, but represents a direct communication environment in which the terminal communicates with the terminal. Inter-cluster transmission 230 is performed between a transmitting cluster 210 and a receiving cluster 220. A master terminal 211 transmits data to be transmitted to the receiving cluster 220 to a slave terminal 212 and thus the master terminal 211 and the slave terminal 212 share the data, and the slave terminal 222 transmits data received from the transmitting cluster 210 to the master terminal 221 and thus the slave terminal 222 and the master terminal 221 share the data.

In FIG. 2, reference numeral 211 indicates the master terminal belonging to the transmitting cluster 210, and reference numeral 212 indicates the slave terminal belonging to the transmitting cluster 210. Further, reference numeral 221 indicates the master terminal belonging to the receiving cluster 220, and reference numeral 222 indicates the slave terminal belonging to the receiving cluster 220.

The master terminal and the slave terminal illustrated in FIGS. 1 and 2 are classified based on a role of the terminal, not on their unique characteristics. When the terminal having a master function and a slave function transmits/receives its own data, the terminal is the master terminal and configures the cluster with peripheral slave terminals to be able to perform the cooperation communication. Further, the terminal having the master function and the slave function configures the cluster with peripheral master terminals to be able to perform the cooperation communication. When the terminal has only the slave function, the terminal configures the cluster with the peripheral master terminals to be able to perform only the cooperation communication.

The slave terminal configuring the cluster to perform the cooperation communication may be a mobile or fixed device installed by a user and a mobile or fixed device installed by a network operator.

In the following description, the cluster transmitting the data is defined as a transmitting cluster (Tx cluster) and the cluster receiving the data is defined as a receiving cluster (Rx cluster). In the cellular network environment, in the case of the downlink, the transmitting cluster is replaced with the base station, and in the case of the uplink, the receiving cluster is replaced with the base station.

Figure 3:
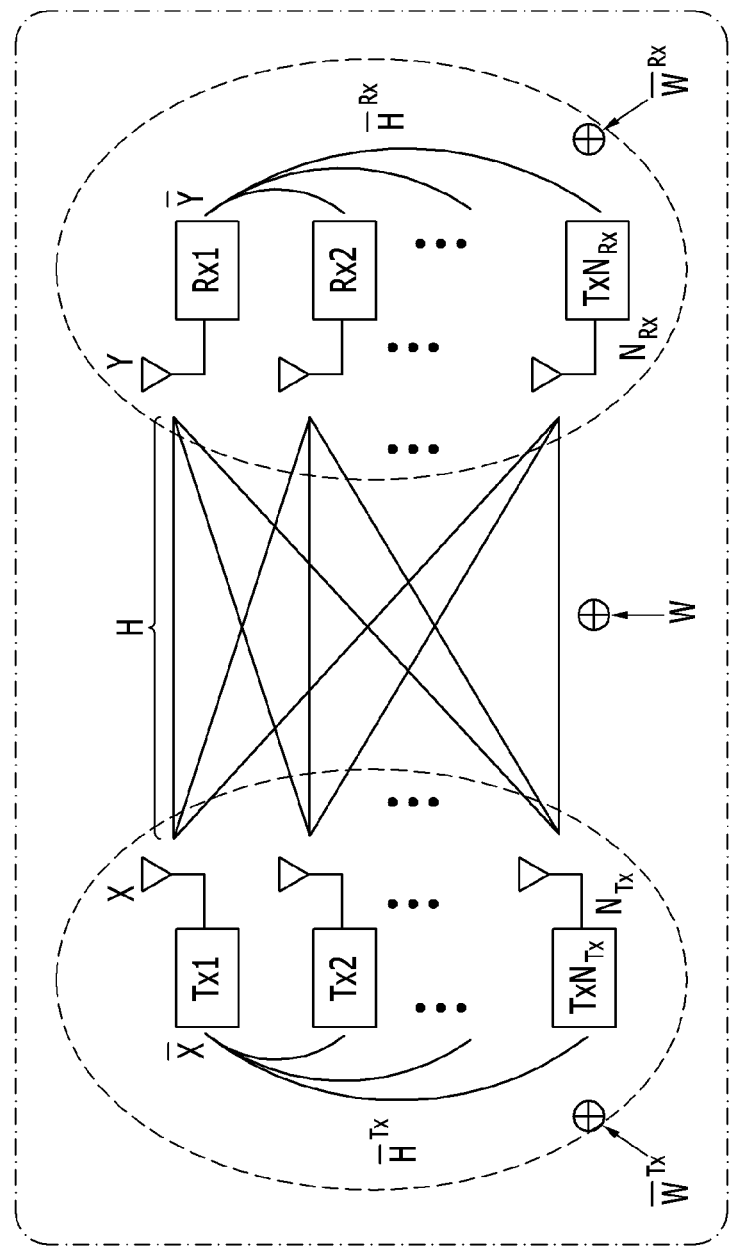
FIG. 3 is a diagram illustrating a system model which simplifies a cooperation MIMO transmitting/receiving method according to an exemplary embodiment of the present invention.

FIG. 3 is a diagram illustrating a system model which simplifies a cooperation MIMO transmitting/receiving method according to an exemplary embodiment of the present invention.

When a transmitted symbol matrix of the transmitting cluster is X, a received symbol matrix is Y, a channel matrix between the clusters is H, and a noise matrix of a received symbol is W, received symbol matrix is defined by the following Equation 3.

$$Y = HX + W \quad \text{(Equation 3)}$$

In the above Equation 3, matrices Y, H, X, and W having y, h, x, and w as elements are defined by the following Equation 4.

$$Y = \begin{bmatrix} y_1 \\ y_2 \\ \vdots \\ y_{N_R} \end{bmatrix}, H = \begin{bmatrix} h_{11} & h_{12} & \cdots & h_{1N_T} \\ h_{21} & \ddots & & \\ \vdots & & h_{ij} & \\ & & & \ddots \\ h_{N_R 1} & & \cdots & h_{N_R N_T} \end{bmatrix},$$

$$X = \begin{bmatrix} x_1 \\ x_2 \\ \vdots \\ x_{N_T} \end{bmatrix}, W = \begin{bmatrix} w_1 \\ w_2 \\ \vdots \\ w_{N_T} \end{bmatrix}$$

(Equation 4)

In the above Equation 4, element $w_k$ of the matrix W is additive circular symmetric white Gaussian noise having statistical characteristics of average 0 and dispersion $N_o$, in which $N_o$ is a power spectrum density of thermal noise.

The transmitting cluster (Tx cluster) may be configured of one master terminal and $N_{Tx}$ slave terminals, and the receiving cluster (Rx cluster) may be configured of one master terminal and $N_{Rx}$ slave terminals. Further, the master terminal and the slave terminal may have one or more antennas.

It is assumed that a total number of antennas of one master terminal and $N_{Tx}$ slave terminals configuring the transmitting cluster or the number of transmitting antennas of the base station is $M_{Tx}$. Further, it is assumed that a total number of antennas of one master terminal and $N_{Rx}$ slave terminals configuring the receiving cluster or the number of receiving antennas of the base station is $M_{Rx}$. In this case, as in the existing MIMO transmitting/receiving method, the cooperation MIMO transmitting/receiving method according to the exemplary embodiment of the present invention may also obtain a spatial multiplexing gain of maximum $M_{min}$ (smaller value of $M_{Tx}$ and $M_{Rx}$) or a spatial diversity gain of maximum $M_{Tx} \times M_{Rx}$ between the transmitting/receiving clusters or between the cluster and the base station.

Next, an operating procedure of the cooperation MIMO transmission/reception according to the exemplary embodiment of the present invention will be described. The operating procedure of the cooperation MIMO transmission/reception according to the exemplary embodiment of the present invention may be largely divided into four procedures of initiation, intra-cluster transmission, macro (base station) or inter-cluster transmission, and termination. The operating procedure of the four stages is a procedure for cooperation MIMO transmission/reception, and a basic procedure and process for data transmission/reception in the wireless mobile communication environment may be added.

<Initiation Procedure>

In the initiation procedure, the slave terminal performs an initial synchronization procedure (for example, frame synchronization, symbol synchronization, and frequency synchronization). The master terminal may periodically transmit a synchronizing signal for synchronization of the slave terminal. In the cellular network environment, the slave terminal may use a signal of the base station and a signal or a GPS signal of the master terminal for synchronization. In the distributed network environment, the slave terminal may use the signal or the GPS signal of the master terminal for synchronization.

Further, in the initiation procedure, the master terminal and the slave terminal attempt mutual search and discovery and perform a clustering procedure. The mutual search and discovery may be performed based on a direct communication technology between the terminals. For the mutual search and discovery, IEEE 802.16n, TETRA DMO, IEEE 802.15, and the like, which are direct communication wireless interface technologies, may be used. Further, the clustering procedure (i.e., configuration of the cluster) may be performed by an exchange of a unique identifier ID (for example, a MAC address and the like) or a temporary identifier (for example, a station ID and the like) between the master terminal and the slave terminal. Further, additional control information for the cooperation MIMO transmission/reception may be exchanged between the master terminal and the slave terminal.

The master terminal and the slave terminal configure the cluster depending on the surrounding environment (intensity of interference signal, and the like) of the cluster, and may select whether to perform the cooperation MIMO transmission/reception. Further, in the cellular network environment, the master terminal and the slave terminal configure the cluster and may determine whether to perform the cooperation MIMO transmission/reception according to an instruction of the base station. Here, the base station may instruct the cluster configuration of the master terminal and the slave terminal on whether to transmit the cooperation MIMO in consideration of transmission capacity, interference situations, quality of service (QoS), and the like. To this end, the slave terminal may receive control information (for example, control channel, message, and the like) broadcast by the base station and control information transmitted from the master terminal configuring the cluster to control the slave terminal.

<Intra-Cluster Transmission Procedure>

The master terminal and the slave terminal configuring the cluster share the transmitted data and the received data for the cooperation MIMO transmission/reception.

In the transmitting cluster, the master terminal transmits data to be transmitted from their own to the slave terminal and thus the master terminal and the slave terminal share the data. In this case, a transmission format may be a protocol data unit (PDU) of the MAC layer or a symbol type of a physical layer.

Meanwhile, in the receiving cluster, the slave terminal transmits a signal to be received by the master terminal to the master terminal and thus the slave terminal and the master terminal share the signal. In this case, the transmission format may be the symbol type of the physical layer. Further, the slave terminal may perform processing (for example, quantization, compression source coding, and the like) on the received signal to generate the PDU format of the MAC layer, and transmit the received signal to the master terminal. In this case, in order to increase reliability of the signal transmission, a forward error correction (FEC) method may be applied.

When the number of antennas included in one master terminal configuring the transmitting cluster is $n_{Tx,0}$, and the number of antennas included in each of the $N_{Tx}$ slave terminals is $n_{Tx,1}, n_{Tx,2}, \ldots, n_{Tx,N_{Tx}}$, a total number $M_{Tx}$ of antennas within the transmitting cluster is $$\sum_{k=0}^{N_{Tx}} n_{Tx,k}.$$

The master terminal divides the symbol to be transmitted by $M_{Tx}$, and transmits the symbol to the respective slave terminals by $n_{Tx,1}, n_{Tx,2}, \ldots, n_{Tx,N_{Tx}}$. In this case, the symbol transmitted to the respective slave terminals by the master terminal may be multiplied by a precoding matrix, prior to being transmitted.

The radio resources used for the intra-cluster transmission, or for the macro transmission may be reused for the radio resources used for the inter-cluster transmission. Further, in order for the cluster to reduce interference with the transmission or macro transmission signal, dedicated radio resources for the intra-cluster transmission may be used. For the dedicated radio resources for the intra-cluster transmission, some radio resources within a band for the inter-cluster transmission or the macro transmission may be allocated (in-band type), and radio resources out of a band for the inter-cluster transmission or the macro transmission may be allocated (out-band type). For the out-band type, a licensed band, a quasi-licensed band, or a non-licensed band may be used. Meanwhile, the slave terminal may divide and use the radio resources for the intra-cluster transmission by frequency division multiplexing (FDM), time division multiplexing (TDM), or code division multiplexing (CDM).

The intra-cluster transmission is based on the direct communication technology between the terminals. Here, a specialized wireless interface for the intra-cluster transmission, the same wireless interface (for example, 802.16, LTE, and the like) as the macro (base station) transmission, or the direct communication wireless interface (for example, IEEE 802.16n, WiFi direct, IEEE 802.15, and the like) may be used.

<Macro Transmission or Inter-Cluster Transmission>

In the cellular network environment, in the case of the downlink, the base station transmits the signal and the receiving cluster receives the signal. In the case of the uplink, the transmitting cluster transmits the signal and the base station receives the signal. Meanwhile, in the distributed network environment, the transmitting cluster transmits the signal and the receiving cluster receives the signal. The master terminal and the slave terminal perform measurement and estimation of a radio channel for data demodulation, precoding, beamforming, link adaptation, power control, interference control, and the like. For the measurement and estimation of the radio channel, a preamble, a midamble, a pilot symbol, a reference signal, and the like may be used. The measured and estimated information of the radio channel may be fed back to a transmitting end, if necessary. The radio channel information may be fed back as a control channel or in a message form, but this causes a considerable overhead. The exemplary embodiment of the present invention may apply a modified system model to reduce the overhead.

Figure 4:
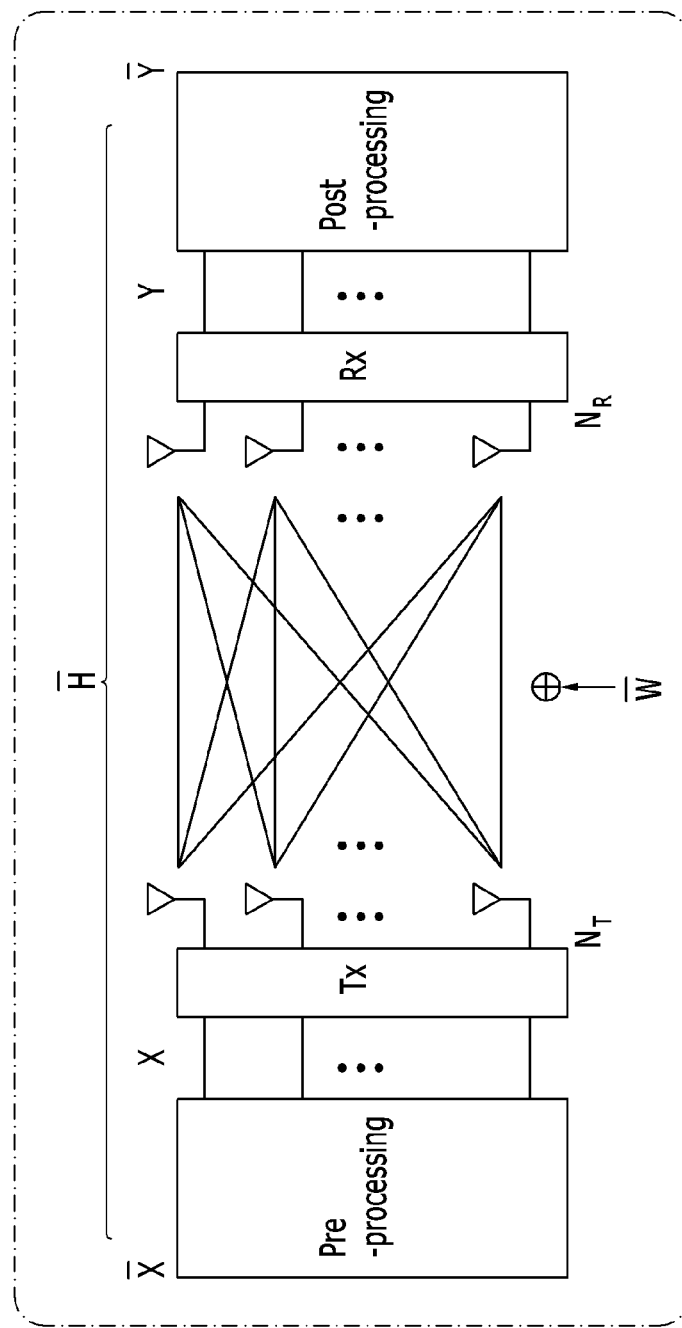
FIG. 4 is a diagram illustrating a modification of the system model of the cooperation MIMO transmitting/receiving method according to an exemplary embodiment of the present invention.

FIG. 4 is a diagram illustrating a modification of the system model of the cooperation MIMO transmitting/receiving method according to the exemplary embodiment of the present invention.

In the system model of FIG. 4, it is assumed that the slave terminal transparently transmits the received signal like an amplify & forward (AF) relay station. In this case, the transmitting/receiving process within the transmitting cluster and receiving cluster may be converted into pre-processing and post-processing. When the channel matrix within the transmitting cluster is defined as $\overline{H}^{Tx}$, the transmitted symbol of the master terminal is defined as $\overline{X}$, and the noise matrix within the transmitting cluster is defined as $\overline{W}^{Tx}$, the transmitted symbol X of the transmitting cluster may be defined by the following Equation 5.

$$X = \overline{H}^{Tx}\overline{X} + \overline{W}^{Tx} \qquad \text{(Equation 5)}$$

Accordingly, during the pre-processing of FIG. 4, the transmitted symbol $\overline{X}$ of the master terminal is converted into the transmitted symbol X of the transmitting cluster.

When the channel matrix within the receiving cluster is defined as $\overline{H}^{Rx}$, the received symbol of the master terminal is defined as $\overline{Y}$, and the noise matrix within the receiving cluster is defined as $\overline{W}^{Rx}$, the received symbol $\overline{Y}$ of the master cluster may be defined by the following Equation 6.

$$\overline{Y} = \overline{H}^{Rx} Y + \overline{W}^{Rx} \quad \text{(Equation 6)}$$

Accordingly, during the post-processing of FIG. 4, the received symbol Y of the receiving cluster is converted into the received symbol $\overline{Y}$ of the master terminal.

Here, $\overline{X}$ and $\overline{Y}$ are defined by the following Equation 7.

$$\overline{X} = \begin{bmatrix} \overline{x}_1 \\ \overline{x}_2 \\ \vdots \\ \overline{x}_{N_T} \end{bmatrix}, \overline{Y} = \begin{bmatrix} \overline{y}_1 \\ \overline{y}_2 \\ \vdots \\ \overline{y}_{N_R} \end{bmatrix} \quad \text{(Equation 7)}$$

Further, the symbol $\overline{X}$ transmitted from the master terminal of the transmitting cluster and the symbol $\overline{Y}$ received by the master terminal of the receiving cluster may be defined by the following Equation 8.

$$\overline{Y} = \overline{H}\overline{X} + \overline{W} = \overline{H}^{Rx}(H(\overline{H}^{Tx}+\overline{X}+\overline{W}^{Tx})+W)+\overline{W}^{Rx} \quad \text{(Equation 8)}$$

In the above Equation 8, $\overline{H}$ and $\overline{W}$ are defined by the following Equation 9.

$$\overline{H} = \overline{H}^{Rx} H \overline{H}^{Tx}$$

$$\overline{W} = \overline{H}^{Rx} H \overline{W}^{Tx} + \overline{H}^{Rx} W + \overline{W}^{Rx} \quad \text{(Equation 9)}$$

In the cellular network environment, in the case of the downlink, $\overline{H}^{Tx}$, $\overline{H}^{Rx}$, $\overline{W}^{Tx}$, $\overline{W}^{Rx}$ are defined by the following Equation 10.

$$\overline{H}^{Tx} = \begin{bmatrix} 1 & 0 & 0 & \cdots & 0 \\ 0 & 1 & & & 0 \\ 0 & & 1 & & \vdots \\ \vdots & & & \ddots & 0 \\ 0 & 0 & \cdots & 0 & 1 \end{bmatrix}, \quad \text{(Equation 10)}$$

$$\overline{H}^{Rx} = \begin{bmatrix} 1 & 0 & 0 & \cdots & 0 \\ 0 & \overline{h}_2^{Rx} & & & 0 \\ 0 & & \overline{h}_3^{Rx} & & \vdots \\ \vdots & & & \ddots & 0 \\ 0 & 0 & \cdots & 0 & \overline{h}_{N_{Rx}}^{Rx} \end{bmatrix}, \overline{W}^{Tx} = \begin{bmatrix} 0 \\ 0 \\ \vdots \\ 0 \end{bmatrix},$$

$$\overline{W}^{Rx} = \begin{bmatrix} 0 \\ \overline{w}_2^{Rx} \\ \vdots \\ \overline{w}_{N_{Rx}}^{Rx} \end{bmatrix}$$

In the cellular network environment, in the case of the uplink, $\overline{H}^{Tx}$, $\overline{H}^{Rx}$, $\overline{W}^{Tx}$, $\overline{W}^{Rx}$ are defined by the following Equation 11.

$$\overline{H}^{Tx} = \begin{bmatrix} 1 & 0 & 0 & \cdots & 0 \\ 0 & \overline{h}_2^{Tx} & & & 0 \\ 0 & & \overline{h}_3^{Tx} & & \vdots \\ \vdots & & & \ddots & 0 \\ 0 & 0 & \cdots & 0 & \overline{h}_{N_{Tx}}^{Tx} \end{bmatrix}, \quad \text{(Equation 11)}$$

$$\overline{H}^{Rx} = \begin{bmatrix} 1 & 0 & 0 & \cdots & 0 \\ 0 & 1 & & & 0 \\ 0 & & 1 & & \vdots \\ \vdots & & & \ddots & 0 \\ 0 & 0 & \cdots & 0 & 1 \end{bmatrix}, \overline{W}^{Tx} = \begin{bmatrix} 0 \\ \overline{w}_2^{Tx} \\ \vdots \\ \overline{w}_{N_{Tx}}^{Tx} \end{bmatrix},$$

$$\overline{W}^{Rx} = \begin{bmatrix} 0 \\ 0 \\ \vdots \\ 0 \end{bmatrix}$$

In the distributed network environment, $\overline{H}^{Tx}$, $\overline{H}^{Rx}$, $\overline{W}^{Tx}$, $\overline{W}^{Rx}$ are defined by the following Equation 12.

$$\overline{H}^{Tx} = \begin{bmatrix} 1 & 0 & 0 & \cdots & 0 \\ 0 & \overline{h}_2^{Tx} & & & 0 \\ 0 & & \overline{h}_3^{Tx} & & \vdots \\ \vdots & & & \ddots & 0 \\ 0 & 0 & \cdots & 0 & \overline{h}_{N_{Tx}}^{Tx} \end{bmatrix}, \quad \text{(Equation 12)}$$

$$\overline{H}^{Rx} = \begin{bmatrix} 1 & 0 & 0 & \cdots & 0 \\ 0 & \overline{h}_2^{Rx} & & & 0 \\ 0 & & \overline{h}_3^{Rx} & & \vdots \\ \vdots & & & \ddots & 0 \\ 0 & 0 & \cdots & 0 & \overline{h}_{N_{Rx}}^{Rx} \end{bmatrix},$$

$$\overline{W}^{Tx} = \begin{bmatrix} 0 \\ \overline{w}_2^{Tx} \\ \vdots \\ \overline{w}_{N_{Tx}}^{Tx} \end{bmatrix}, \overline{W}^{Rx} = \begin{bmatrix} 0 \\ \overline{w}_2^{Rx} \\ \vdots \\ \overline{w}_{N_{Rx}}^{Rx} \end{bmatrix}$$

As such, in the case of applying the system model to the slave terminal using the concept as described for the AF relay station, the master terminal of the receiving cluster measures and estimates only an overall channel $\overline{H}$ represented by a product of the respective channels, and feeds back the measured and estimated channel $\overline{H}$ to be able to reduce the overhead due to the sharing of the channel information. Deleted Texts $\overline{H}$ That is, the master terminal of the receiving cluster measures and estimates only the overall channel $\overline{H}$ instead of the channel information such as the channel $\overline{H}^{Tx}$ within the transmitting cluster, the inter-cluster channel H, and the channel $\overline{H}^{Rx}$ within the receiving cluster, and feeds back the measured and estimated overall channel $\overline{H}$ to be able to reduce the overhead due to the sharing of the channel information.

<Termination Procedure>

The cluster in which the cooperation MIMO transmission/reception is terminated releases the cluster configuration between the master terminal and the slave terminal. The termination procedure may start by an instruction of the master terminal, the slave terminal, or the base station. The terminal in which the termination procedure is terminated may again enter the initiation procedure if the cooperation MIMO transmission/reception is necessary. Before the termination procedure is terminated, the cooperation MIMO transmission/reception may stop according to a change in a surrounding environment (for example, moving of the terminal, fading of the radio channel, interference, and the like). In this case, the master terminal and the slave terminal recognize the release of the cluster and enter the initiation procedure.

Next, the utilization of the radio resources for the intra-cluster transmission, the macro transmission, or the inter-cluster transmission will be described.

Figure 5:
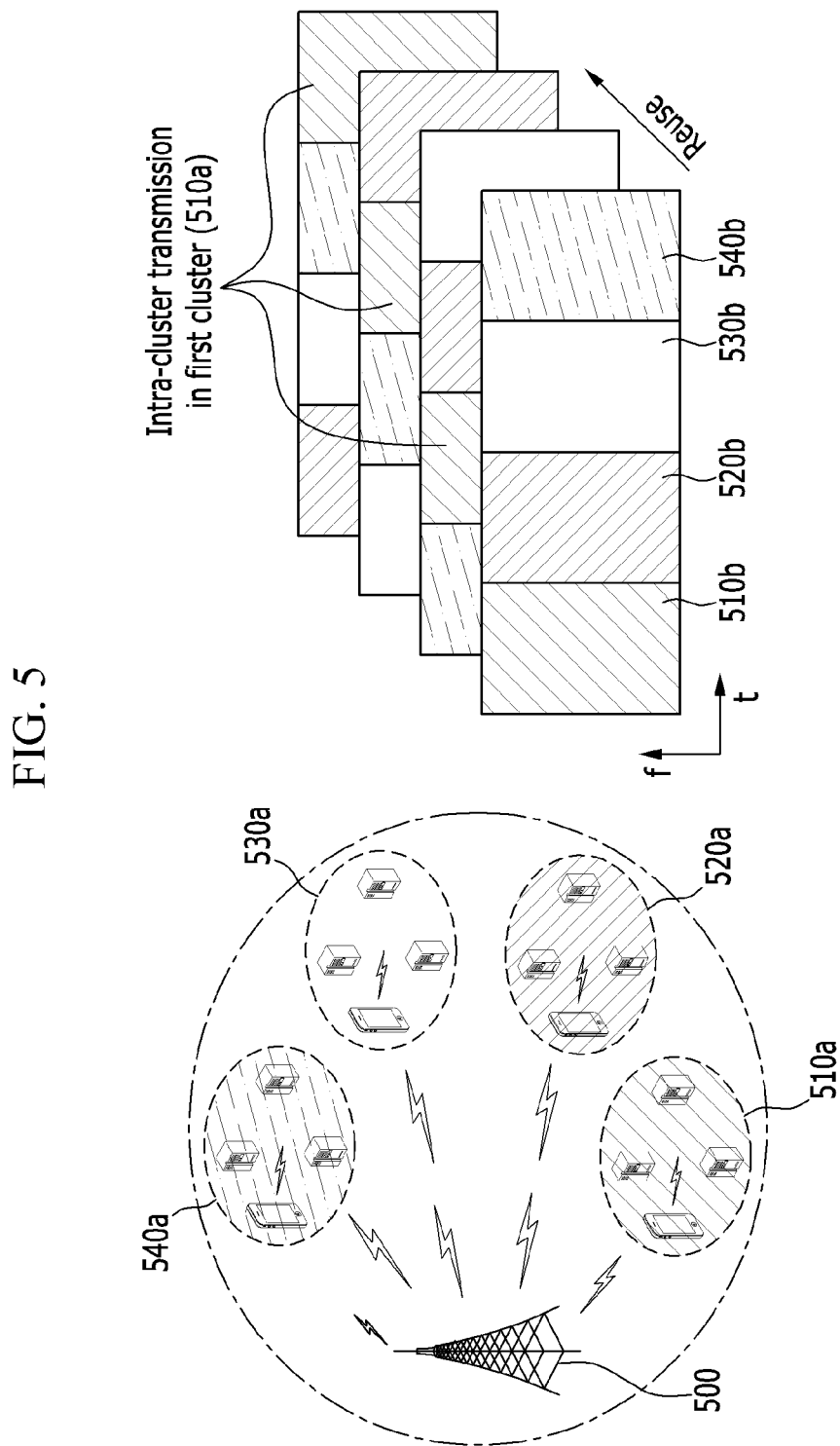
FIG. 5 is a diagram illustrating a method for allocating radio resources according to a first exemplary embodiment of the present invention.

Referring first to FIG. 5, a method for utilizing radio resources will be described for when there are no dedicated resources for the intra-cluster transmission.

FIG. 5 is a diagram illustrating a method for allocating radio resources according to a first exemplary embodiment of the present invention. That is, FIG. 5 is a diagram illustrating the method for utilizing radio resources when there are no dedicated resources for the intra-cluster transmission in the cellular network environment. Describing in more detail, the left drawing of FIG. 5 illustrates, by way of example, the case in which the plurality of terminals within a cell are divided into four clusters, and the right drawing of FIG. 5 illustrates allocation of the radio resources at the time of the configuration of the cluster as illustrated in the left drawing of FIG. 5. The radio resource illustrated in FIG. 5 may be a time resource or a frequency resource.

When there are no dedicated resources for the intra-cluster transmission, the radio resources for the intra-cluster transmission, the macro transmission, or the inter-cluster transmission are reused. As illustrated in FIG. 5, when there are no dedicated resources for the intra-cluster transmission, the radio resources for the macro transmission are reused and thus the transmitting/receiving clusters share the transmitted data or the received symbol. In FIG. 5, it is assumed that each cluster (transmitting cluster or receiving cluster) is configured of one master terminal and three slave terminals, and the number of antennas of each terminal is one and the number of antennas of the base station is four.

In the downlink, a base station 500 performs the macro transmission to first to fourth clusters 510a to 540a using each of radio resources 510b to 540b for macro transmission.

Each of the slave terminals of the second cluster to the fourth cluster 520a to 540a uses the radio resource 510b to transmit the received symbol (symbol previously received through the radio resources 520b to 540b) to the master terminal while the base station transmits data to the first cluster 510a using the radio resource 510b. In other words, at the time of the macro transmission through the radio resource 510b, one slave terminal belonging to the second cluster 520a uses the radio resource 510b to transmit the received symbol to the terminal, one slave terminal belonging to the third cluster 530a uses the radio resource 510b to transmit the received symbol to the terminal, and one slave terminal belonging to the fourth cluster 540a uses the radio resource 510b to transmit the received symbol to the terminal.

Each of other slaves of the slave terminals of the first cluster 510a, the third cluster 530a, and the fourth cluster 540a uses the radio resource 520b to transmit the received symbol to the master terminal while the base station 500 uses the radio resource 520b to transmit data to the second cluster 520a.

Even when the base station 500 uses the radio resource 530b to perform the macro transmission to the third cluster 530a and the base station 500 uses the radio resource 540b to perform the macro transmission to the fourth cluster 540a, as described above, the slave terminals within the cluster each reuse the radio resources 530b and 540b to perform the intra-cluster transmission.

Even in the uplink, the transmitting clusters 510a to 540a use the radio resources 510b to 540b for the macro transmission to perform the macro transmission to the base station 500. Each master terminal of the second to fourth clusters 520a to 540a uses the radio resource 510b to transmit the transmitted symbol to one slave terminal while the first cluster 510a uses the radio resource 510b to transmit the data to the base station. Each master terminal of the first, third, and fourth clusters 510a, 530a, and 540a uses the radio resource 520b to transmit the transmitted symbol to one slave terminal while the second cluster 520a uses the radio resource 520b to transmit the data to the base station. Further, even at the time of transmitting the data to base station using the third transmitting cluster 530a and the fourth transmitting cluster 540a, the remaining master terminals within the cluster reuse the radio resources by the same method as described above, to perform the intra-cluster transmission.

As such, the case in which the cooperation MIMO transmission/reception is performed using the resources may have system capacity of a maximum of $V_1$ times that of the case in which the cooperation MIMO transmission/reception is not performed. Here, the $V_1$ times is defined by the following Equation 13.

$$v_1 = M_{Rx} + 1 \tag{Equation 13}$$

In the downlink, the macro transmission is performed and then the intra-cluster transmission is performed, and in the uplink, the intra-cluster transmission is performed and then the macro transmission is performed. Therefore, the radio resource for the macro transmission and the radio resource for the cluster transmission may be divided by the time division multiplexing (TDM). The frame architecture illustrated in FIG. 5 is a logical representation, but in the actual case, a frame for the macro transmission and a frame for the intra-cluster transmission may be designed to physically have a predetermined time offset.

Meanwhile, FIG. 5 illustrates only the cellular communication environment, but the cellular communication environment is the same as the distributed network environment except for the fact that the base station is replaced by the transmitting/receiving cluster. Even in the distributed network environment, the case in which the cooperation MIMO transmission/reception is performed may have system capacity of a maximum of $V_1$ times that of the case in which the cooperation MIMO transmission/reception is not performed.

Next, referring to FIG. 6, a method for utilizing radio resources will be described for when there are dedicated resources for the intra-cluster transmission.

Figure 6:
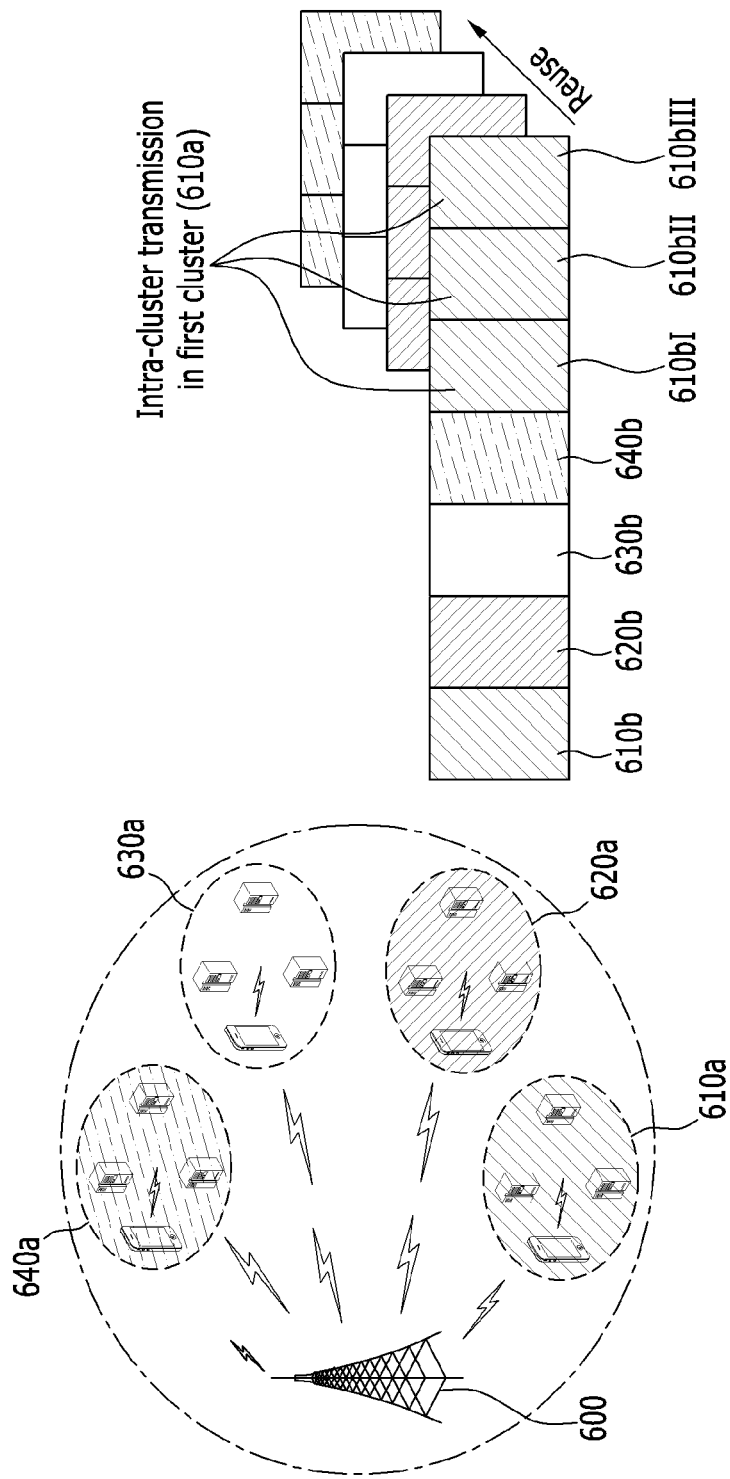
FIG. 6 is a diagram illustrating a method for allocating radio resources according to a second exemplary embodiment of the present invention.

FIG. 6 is a diagram illustrating a method for allocating radio resources according to a second exemplary embodiment of the present invention. That is, FIG. 6 is a diagram illustrating the method for utilizing radio resources when there are dedicated resources for the intra-cluster transmission in the cellular network environment. Describing in more detail, the left drawing of FIG. 6 illustrates, by way of example, the case in which the plurality of terminals within the cell are divided into four clusters, and the right drawing of FIG. 6 illustrates allocation of the radio resources at the time of the configuration of the cluster as illustrated in the left drawing of FIG. 6. The radio resource illustrated in FIG. 6 may be the time resource or the frequency resource.

As illustrated in FIG. 6, when there are the dedicated resources for the intra-cluster transmission, the transmitting/receiving clusters share the transmitted data or the received symbol using the dedicated resources. In FIG. 6, it is assumed that each cluster (transmitting cluster or receiving cluster) is configured of one master terminal and three slave terminals, and the number of antennas of each terminal is one and the number of antennas of the base station is four.

In the downlink, a base station 600 uses each of radio resources 610b to 640b for macro transmission to perform the macro transmission to first to fourth clusters 610a to 640a.

Each of the slave terminals of the first to fourth clusters 610a to 640a uses a dedicated radio resource 610bI for the intra-cluster transmission to transmit the received symbols to the master terminals through the macro transmission resources 610b to 640b. That is, one of the slave terminals of the first cluster 610a uses the radio resource 610bI to transmit the received symbol to the master terminal through the macro transmission resource 610b. In this case, one of the slave terminals of the second cluster 620a uses the radio resource 610bI to transmit the received symbol to the master terminal through the macro transmission resource 620b. The slave terminal of the third cluster 630a and the slave terminal of the fourth cluster 640a identically use the dedicated resources for the intra-cluster transmission to perform the intra-cluster transmission.

Further, radio resources 610bII and 610bIII are used for the intra-cluster transmission by the same method as the radio resource 610bI. That is, the radio resource 610bII is used for other slave terminals of the first to fourth terminals 610a to 640a, and the radio resource 610bIII is used for another remaining slave terminals of the first to fourth clusters 610a to 640a.

In the uplink, the first to fourth clusters 610a to 640a each use the radio resources 610b to 640b to perform the macro transmission to the base station 600. The master terminals of the first to fourth clusters 610a to 640a use the dedicated radio resource 610bI to transmit the transmitted data to one of the slave terminals of each cluster. Further, the radio resources 610bII and 610bIII are also used for the intra-cluster transmission by the same method as the radio resource 610bI.

As described in the second exemplary embodiment of the present invention, the case in which the cooperation MIMO transmission/reception is performed using the resources may increase system capacity a maximum of $V_2$ times that of the case in which the cooperation MIMO transmission/reception is not performed. Here, the $V_2$ times is defined by the following Equation 14.

$$v_2 = \frac{M_{Rx}+1}{\frac{M_{Rx}}{M_{Rx}+1}+1} \quad \text{(Equation 14)}$$

In the above Equation 14, when $M_{Rx}$ is very large, $V_2$ may be approximated depending on the following Equation 15.

$$v_2 \approx \frac{M_{Rx}+1}{2} \quad \text{(Equation 15)}$$

In FIG. 6, in the downlink, the macro transmission is performed and then the intra-cluster transmission is performed, and in the uplink, the intra-cluster transmission is performed and then the macro transmission is performed. Therefore, the radio resource for the macro transmission and the radio resource for the intra-cluster transmission may be divided by the time division multiplexing (TDM). The frame architecture illustrated in FIG. 6 is a logical representation, but in the actual case, a frame for the macro transmission and a frame for the intra-cluster transmission may be designed to physically have a predetermined time offset. Further, the dedicated resource for the intra-cluster transmission may be configured by the TDM, the FDM, and the CDM.

Meanwhile, in FIGS. 5 and 6, the radio resource for the macro transmission may correspond to one of a plurality of scheduling resources which are present in the frame. Meanwhile, in an OFDM frame architecture, the frame may be divided into S scheduling blocks and one of the scheduling blocks may be used as the dedicated radio resource for the intra-cluster transmission. As such, the case in which the cooperation MIMO transmission/reception is performed using the resources may have system capacity a maximum of $V_3$ times that of the case in which the cooperation MIMO transmission/reception is not performed. Here, the $V_3$ times is defined by the following Equation 16.

$$v_3 = \frac{M_{Rx}+1}{\frac{M_{Rx}}{S(M_{Rx}+1)}+1} \quad \text{(Equation 16)}$$

In the above Equation 16, when $M_{Rx}$ and S are very large, V3 may be approximated depending on the following Equation 17.

$$v_3 \approx \frac{M_{Rx}+1}{\frac{1}{S}+1} \approx M_{Rx}+1 \quad \text{(Equation 17)}$$

Meanwhile, FIG. 4 describes that the slave terminal transparently transmits the received signal like the AF relay station. The slave terminal serving as the AF relay station will be described with reference to FIG. 7.

FIG. 7 is a diagram illustrating a slave terminal according to an exemplary embodiment of the present invention.

As illustrated in FIG. 7, a slave terminal 700 according to an exemplary embodiment of the present invention includes an ADC unit 701, a cyclic prefix (CP) removing unit 702, a fast Fourier transform (FFT) unit 703, a subcarrier demapping unit 704, a buffer unit 705, a coding unit 706, a modulation unit 707, a subcarrier mapping unit 708, an inverse fast Fourier transform (IFFT) unit 709, a CP insertion unit 710, and a DAC unit 711. Here, a detailed configuration and an operation of the ADC unit 701, the cyclic prefix (CP) removing unit 702, the fast Fourier transform (FFT) unit 703, the subcarrier demapping unit 704, the subcarrier mapping unit 708, the IFFT unit 709, the CP insertion unit 710, and the DAC unit 711 may be easily appreciated by a person having ordinary skill in the art to which the present invention pertains, and therefore the detailed description thereof will be omitted.

The slave terminal transmits the data received from the base station or other clusters to the master terminal as it is for the cooperation MIMO reception. Further, the slave terminal transmits the data received from the slave terminal to the base station or other clusters as it is for the cooperation MIMO transmission. An operation of transmitting the received signal as it is by the slave terminal will be described in detail with reference to FIG. 7.

The ADC unit 701 converts the signal received through the receiving antenna into a digital signal, and the CP removing unit 702 removes the cyclic prefix (CP) from the digital signal. The FFT unit 703 performs FFT to convert the received signal into a frequency domain symbol, and the subcarrier demapping unit 704 demaps the subcarrier in the frequency domain symbol.

Further, the buffer unit 705 buffers the received signal for a predetermined time to retransmit the received signal again. The coding unit 706 performs source coding or channel coding and the modulation unit 707 modulates the source coded or channel coded signal.

The subcarrier mapping unit 708 maps the modulated signal with the subcarrier to transmit the modulated signal, and the IFFT unit 709 performs IFFT to convert the transmitted signal into a time domain symbol. The CP insertion unit 710 inserts the CP and the DAC unit 711 converts the digital signal into an analog signal and transmits it.

The buffer unit 705, the coding unit 706, and the modulation unit 707 are used to increase the reliability of the transmitted signal, but may be omitted.

The slave terminal 700 according to the exemplary embodiment of the present invention converts the received signal into the digital signal to be transmitted again and processes the digital signal, and as a result, may transmit only the required data.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allowing a first terminal to transmit first data, comprising:
    forming a first cluster including the first terminal and a second terminal performing cooperation communication with the first terminal;
    forming a second cluster including a third terminal and a fourth terminal;
    transmitting second data, which is included in the first data, from the first terminal to the second terminal using a first resource; and
    transmitting, by the first terminal, the first data using a second resource that is different from the first resource to a target node that is outside of the first cluster in cooperation with the second terminal, each of the first and second resources being reusable for data transmission within the first cluster and data transmission to the target node at different times,
    transmitting, by the first cluster, third data to the target node using the second resource in a first period;
    sharing, by the fourth terminal, fourth data with the third terminal using the second resource for the cooperation communication in the first period,
    transmitting, by the second cluster, fifth data to the target node using a third resource in a second period; and
    sharing, by the first terminal, sixth data with the second terminal using the third resource for the cooperation communication in the second period.

2. The method of claim 1, wherein
    the transmitting of the first data includes:
    transparently transmitting, by the second terminal, the second data to the target node; and
    transmitting, by the first terminal, the remaining data other than the second data in the first data to the target node.

3. The method of claim 2, wherein the second terminal performs the same role as an amplify forward (AF) relay station.

4. The method of claim 1, wherein the forming of the first cluster includes:
    synchronizing the second terminal with the first terminal; and
    searching for the second terminal.

5. The method of claim 1, wherein the second data is transmitted to the second terminal through direct communication between the first terminal and the second terminal.

6. The method of claim 1, wherein the target node is a base station or a cluster different from the first cluster including the first terminal and the second terminal.

7. A method for allowing a first terminal to transmit first data, comprising:
    forming a first cluster including the first terminal and a second terminal performing cooperation communication with the first terminal;
    forming a second cluster including a third terminal and a fourth terminal;
    transmitting second data, which is included in the first data, from the first terminal to the second terminal using a first resource;
    transmitting, by the first terminal, the first data using a second resource that is different from the first resource to a target node that is outside of the first cluster in cooperation with the second terminal, each of the first and second resources being reusable for data transmission within the first cluster and data transmission to the target node at different times;
    transmitting, by the first cluster, third data to the target node using the second resource in a first period;
    transmitting, by the second cluster, fourth data to the target node using a third resource in a second period;
    sharing, by the first terminal, fifth data with the second terminal using a fourth resource for the cooperation communication in a third period; and
    sharing, by the third terminal, sixth data with the fourth terminal using the fourth resource for the cooperation communication in the third period.

8. A method for allowing a first terminal to receive first data, comprising:
    forming a first cluster including the first terminal and a second terminal performing cooperation communication with the first terminal;
    forming a second cluster including a third terminal and a fourth terminal;
    receiving second data, by the first terminal from a target node, using a first resource, the target node being outside of the first cluster, the second data being included in the first data;

receiving third data, by the first terminal from the second terminal, using a second resource that is different from the first resource, the third data being included in the first data, each of the first and second resources being reusable for data transmission within the first cluster and data transmission to the first terminal at different times;

performing, by the first cluster, macro transmission with the target node using the first resource in a first period;

sharing, by the fourth terminal, fourth data with the third terminal using the first resource for the cooperation communication in the first period;

performing, by the second cluster, macro transmission with the target node using a third resource in a second period; and sharing, by the second terminal, fifth data with the first terminal using the third resource for the cooperation communication in the second period.

9. The method of claim 8, wherein the second terminal transparently transmits the third data to the first terminal.

10. The method of claim 8, wherein the target node is a base station or a cluster different from the first cluster including the first terminal and the second terminal.

11. The method of claim 8, wherein the forming of the first cluster includes:
synchronizing the second terminal with the first terminal; and
searching for the second terminal.

12. A method for allowing a first terminal to receive first data, comprising:

forming a first cluster including the first terminal and a second terminal performing cooperation communication with the first terminal;

forming a second cluster including a third terminal and a fourth terminal;

receiving second data, by the first terminal from a target node, using a first resource, the target node being outside of the first cluster, the second data being included in the first data;

receiving third data, by the first terminal from the second terminal, using a second resource that is different from the first resource, the third data being included in the first data, each of the first and second resources being reusable for data transmission within the first cluster and data transmission to the first terminal at different times;

performing, by the first cluster, macro transmission with the target node using the first resource in a first period;

performing, by the second cluster, macro transmission with the target node using a third resource in a second period;

sharing, by the second terminal, fourth data with the first terminal using a fourth resource for the cooperation communication in a third period; and sharing, by the fourth terminal, fifth data with the third terminal using the fourth resource for the cooperation communication in the third period.

13. The method of claim 12, wherein the first and second resources are divided into the third resource by time division multiplexing (TDM).

* * * * *